United States Patent Office 2,839,585
Patented June 17, 1958

2,839,585

CONVERSION OF RETINENE-PHENOLIC MATERIAL COMPLEXES TO VITAMIN A

Orris D. Hawks, Rochester, N. Y., assignor to Eastman Kodak Company, Rochester, N. Y., a corporation of New Jersey No Drawing. Application April 5, 1955
Serial No. 499,520

10 Claims. (Cl. 260—617)

This invention is concerned with a method for preparing vitamin A, and more particularly with a method for preparing vitamin A from a vitamin A precursor having substantial stability.

Vitamin A, also called vitamin A alcohol and axerophtol, is a well-konw fat-soluble vitamin classically obtained from the unsaponifiable matter of such materials as fish liver oils. Likewise, vitamin A can be prepared synthetically by several known methods.

Vitamin A is a very labile material and its biological activity is easily destroyed by oxidation. Accordingly, numerous antioxidants such as N,N-diphenyl-p-phenylenediamine, nordihydroguaiaretic acid, butylated hydroxy anisole, butylated hydroxy toluene and other antioxidants are used to increase the stability of vitamin A. However, even in the presence of such antioxidants, vitamin A is an unstable commercial product, and storing for extended periods of time results in substantial loss of vitamin A biological activity due to oxidation.

It is accordingly an object of this invention to provide a novel means by which a vitamin A precursor having substantial stability can be readily converted to vitamin A.

It is a further object of this invention to provide a new and improved method for preparing vitamin A.

It is an additional object of this invention to provide a novel process for converting a vitamin A precursor to vitamin A in the presence of substantial amounts of water.

These and other objects of this invention are accomplished by admixing a complex consisting of retinene and a phenolic material, a sodium or potassium borohydride, and a solvent or liquid carrier substantially inert to the borohydride, and, preferably, thereafter hydrolyzing the resulting reaction product to vitamin A.

As disclosed in Benton et al., United States Patents 2,683,746 and 2,693,747, dated July 13, 1954, the all-trans form of vitamin A aldehyde, commonly called retinene readily forms crystalline complexes with certain phenolic materials. Vitamin A aldehyde can exist in the form of several geometric isomers based on the cis and trans configuration around such olefinic bonds as illustrated by the starred positions in the structural formula,

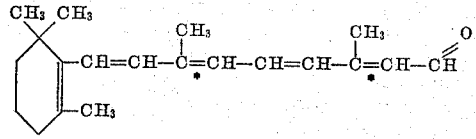

Only retinene, the all-trans geometric isomer of vitamin A aldehyde which is more generally called 2,6-trans,trans vitamin A aldehyde, combines with phenolic materials to form crystalline complexes. The vitamin A isomer having the highest biological activity also has an all-trans geometric configuration.

Typical of the many phenolic materials that form crystallizable complexes with retinene are hydroquinone; monoalkyl hydroquinones such as 2-methyl hydroquinone, 2-ethyl hydroquinone, 2-tertiary-amyl hydroquinone and similar monoalkyl hydroquinones; monohalohydroquinones such as 2-chlorohydroquinone, 2-bromo-hydroquinone and the like; 2,5-dialkyl hydroquinone such as 2,5-dimethyl hydroquinone, 2,5-diethyl hydroquinone, 2,5-di-tertiary amyl hydroquinones and the like; 2,5-dihalohydroquinones, such as 2,5-dichlorohydroquinone; 4-alkoxy phenols such as 4-methoxy phenol, 2-methyl-4-methoxy phenol and the like; 4-dialkylamino phenols such as 4-dimethylamino phenol, 4-diethylamino phenol, 2-methyl-4-dimethylamino phenol and the like; phenol; 3-alkyl, 3-halogen and 3-hydroxy substituted phenols such as 3-methyl phenol, 3-ethyl phenol, 3-octyl phenol, 3-chlorophenol, resorcinol and similar meta substituted phenols; 4-halogen and 4-alkyl substiuted phenols such as 4-methyl phenol, 4-butyl phenol, 4-bromophenol and similar para-substituted phenols; alpha-naphthol and beta-naphthol; phenyl hydroquinone; 3,4-dialkylphenols such as 3,4-dimethylphenol, 3,4-dibutylphenol and related 3,4-dialkylphenols; 3-alkyl-4-halogen substituted pheonls such as 3-methyl-4-bromophenol, 3-amyl-4-chlorophenol and similar 3-alkyl-4-halogen substituted phenols; sesamol; 2,2'-alkyl-bis-(4-alkoxy phenols) such as 2,2'-isobutylidene-bis-(4-methoxy phenol), 2,2'-methylene-bis-(4-butoxy phenol), 2,2'-octylidene-bis-(4-ethoxy phenol), and the like; 2,2'-alkyl-bis-(hydroquinone) such as 2,2'-isobutylidene-bis-(hydroquinone), 2,2'-octylidene-bis-(hydroquinone) and related compounds; and 3-hydroxy-4-halogen substituted phenols such as 3-hydroxy-4-chlorophenol, 3-hydroxy-4-bromophenol, and related phenolic compounds. Complexes of retinene and any of the above phenolic materials, or complexes of retinene and any other phenolic material, can be employed in the present process. The term "phenolic material," as used herein, refers broadly to that group of organic compounds which contain one or more hydroxyl groups attached to an aromatic ring.

Some phenolic materials form complexes with equimolar proportions of retinene, while other phenolic materials form complexes consisting of one molar proportion of phenolic material and two molar proportions of retinene. The present process can be applied equally as well to complexes containing one or two retinene moieties.

The present crystalline retinene-phenolic material complexes or adducts are quite stable to oxidation and can be stored for considerably longer periods of time than any known form of vitamin A material. The stabilities of several complexes were tested at varying temperatures for a period of about 1000 hours. The crystalline samples were uncovered and exposed directly to the air. The following table shows the extreme stability of three typical retinene complexes.

TABLE

| Complex | Percent Recovery After 1,000 Hours | |
|---|---|---|
| | 45° C. | 55° C. |
| Retinene-Hydroquinone | 98 | 101 |
| Retinene-2,5-di-tertiary Butyl Hydroquinone | 101 | 94 |
| Retinene-Sesamol | 100 | 100 |

Further, the crystalline retinene-phenolic material complexes described in the above table are substantially more stable than vitamin A stabilized with an amount of phenolic material equivalent to the phenolic material moiety in these tabulated complexes.

The stable complexes comprised of retinene and a phenolic material are precursors of the more labile vitamin A as they can be readily and practically reduced to vitamin A with certain alkali metal borohydrides. Alkali metal borohydrides are well-known and are described in such references as Schlesinger et al., United States Patent 2,534,533 dated December 19, 1950, and in Schlesinger et al., United States Patent 2,494,968, dated January 17, 1950. For use in the present invention, suitable borohydrides include substituted as well as unsubstituted borohydrides. Substituted borohydrides, wherein up to three hydrogen atoms have been replaced by such inert and relatively non-reactive substituents as alkyl radicals, aryl radicals, alkoxy radicals and halogen atoms, can be employed. The alkali metals sodium and potassium can be the alkali metal portion of the borohydrides used in practicing the invention. Typical of the suitable borohydrides are sodium borohydride, $NaBH_4$; potassium borohydride, $KBH_4$; sodium diethylborohydride $$NaBH_2(CH_2CH_3)_2$$

sodium trimethoxyborohydride, $NaBH(OCH_3)_3$; potassium triphenylborohydride, $KBH(C_6H_5)_3$; sodium trifluoroborohydride, $NaBHF_3$; and other related sodium or potassium borohydrides.

A wide range of solvents or liquid carriers can be employed in the present process. Any solvent or liquid carrier substantially inert to the sodium and potassium borohydrides can be utilized. The use of expensive, highly inflammable and difficult to handle solvents such as diethyl ether is not necessary, although such solvents can be employed. Further, the reaction can be effected in the presence of substantial amounts of water. The borohydrides are relatively soluble in substantially inert polar solvents such as the lower aliphatic alcohols as illustrated by methanol, ethanol, propanol and butanol, and accordingly, the reaction is preferably effected in such polar solvents, or aqueous mixtures thereof. Mutual solubilizing agents such as glycerine can also be employed to aid in dissolving the retinene complex in such reaction mixtures. However, it is not essential that all of the reactants be completely soluble in the reaction mixture as the reaction can be effected by merely associating the reactants with each other as a suspension or a slurry in the reaction mixture. Additional suitable solvents or liquid carriers include petroleum ethers; dioxane; nitrogen containing solvents such as methylamine, diethylamine, pyridine and others; aromatic solvents such as benzene, toluene and the like; and any other solvent or liquid carrier that is substantially inert to the sodium or potassium borohydrides.

Retinene-phenolic material complexes react readily with the alkali metal borohydrides, even at temperatures substantially below room temperature. The reaction also can be effected at elevated temperatures, although the reaction is preferably and conveniently effected at about room temperature.

An intermediate product forms on reacting retinene-phenolic material complexes with the sodium and potassium borohydrides. The exact nature of the intermediate reaction product is not known although it is believed to be an alcoholate of vitamin A. However, this intermediate reaction product can be readily hydrolyzed to vitamin A with basic hydrolyzing agents, aqueous solutions of such alkalis as potassium and sodium hydroxide being particularly effective, or with acidic hydrolyzing agents such as aqueous solutions of sulfuric acid, hydrochloric acid and acetic acid. Likewise, the hydrolysis can be effected in the reaction mixture by simply diluting with water, the alkali metal portion of the borohydride contributing to the basic properties of such a mixture.

The invention is illustrated by the following examples of certain preferred embodiments thereof, it being understood that the examples are not intended to limit the scope of the invention unless otherwise specifically indicated.

*Example 1*

A 4.0 g. sample of crystalline retinene-hydroquinone complex consisting of one molar proportion of hydroquinone and two molar proportions of retinene, and having $E_{1cm.}^{1\%}$ (380 m$\mu$)=1060 in ethanol, was dissolved in 30 ml. of methanol by warming. The solution was cooled to about room temperature and 0.093 g. of sodium borohydride was added. Immediate reaction took place. The reaction mixture was washed with water and extracted with about 50 ml. of diethyl ether. The ether extract was thereafter washed with about 50 ml. N/2 potassium hydroxide with stirring, the ether phase separated from the mixture, and thereafter the ether removed by evaporation on a steam bath. The resulting clear, reddish colored oil product weighed 2.80 g., showed $E_{1\ cm.}^{1\%}$ (325 m$\mu$)=1585 in ethanol, and exhibited a vitamin A potency equivalent to 2,760,000 U. S. P. units per gram by the standard antimony trichloride blue color assay method.

*Example 2*

A 50.0 g. sample of crystalline retinene-hydroquinone complex consisting of one molar proportion of hydroquinone and two molar proportions of retinene, and having $E_{1\ cm.}^{1\%}$ (380 m$\mu$)=995 in ethanol, was dissolved in 300 ml. of methanol. A 3.0 g. sample of potassium borohydride was dissolved in 45 ml. of water and added to the dissolved complex. The resulting mixture was allowed to react for 20 mniutes at about 20° C. with stirring. Thereafter, 250 ml. of petroleum ether ("Skellysolve F") and 250 ml. of 6% acetic acid were added to the reaction mixture, the mixture stirred, and the organic phase containing the vitamin A product separated therefrom. The separated vitamin A containing phase was washed with an additional 250 ml. of 6% acetic acid and several portions of water. The solvent was removed by evaporation on a steam bath to yield 34.05 g. of vitamin A having $E_{1\ cm.}^{1\%}$ (325 m$\mu$)=1759 in ethanol.

*Example 3*

An 11.0 g. sample of a crystalline complex consisting of a one molar proportion of retinene and a one molar proportion of 2,5-di-tertiary amyl hydroquinone, having $E_{1\ cm.}^{1\%}$ (380 m$\mu$)=737 in ethanol, was dissolved in 50 ml. of methanol. To the dissolved complex was added 0.8 g. of sodium borohydride dissolved in 25 ml. of methanol. The resulting mixture was allowed to react, with constant stirring, for 20 minutes at a temperature of about 20° C., and thereafter extracted with 100 ml. of diethyl ether. The resulting ether extract was washed three times with 250 ml. portions of 10% sulfuric acid, three times with 250 ml. portions of 10% sodium bicarbonate, and once with 250 ml. of water. The solvent was removed by evaporation to yield a vitamin A product having $E_{1\ cm.}^{1\%}$ (325 m$\mu$)=799 in ethanol.

Thus, by means of this invention, retinene-phenolic material complexes can be simply converted to vitamin A. As these complexes have substantial stability, the present process provides a convenient and highly practical method for making vitamin A readily available from a precursor that can be stored with less loss due to oxidation than vitamin A.

Although the invention has been described in considerable detail with reference to certain preferred embodiments thereof, it will be understood that variations and modifications can be effected within the spirit and scope of the invention as described hereinabove and as defined in the appended claims.

I claim:

1. The process of converting a complex consisting of retinene and a phenolic material to vitamin A alcohol which comprises admixing said complex, an alkali metal borohydride selected from the class consisting of sodium borohydrides and potassium borohydrides, and a liquid carrier substantially inert to said borohydride, and thereafter hydrolyzing the resulting reaction product.

2. The process which comprises admixing a complex consisting of retinene and a phenolic material, sodium borohydride, and a liquid carrier substantially inert to said borohydride, and thereafter hydrolyzing the resulting reaction product to vitamin A alcohol.

3. The process which comprises admixing a complex consisting of retinene and a phenolic material, potassium borohydride, and a liquid carrier substantially inert to said borohydride, and thereafter hydrolyzing the resulting reaction product to vitamin A alcohol.

4. In the preparation of vitamin A alcohol, the process which comprises admixing a complex consisting of retinene and a phenolic material, an alkali metal borohydride selected from the class consisting of sodium borohydrides and potassium borohydrides, and a liquid carrier comprised of a polar solvent substantially inert to said borohydride, and thereafter hydrolyzing the resulting reaction product.

5. The process which comprises admixing a complex consisting of retinene and a phenolic material, an alkali metal borohydride selected from the class consisting of sodium borohydrides and potassium borohydrides, and an aqueous carrier substantially inert to said borohydride, and thereafter hydrolyzing the resulting reaction product to vitamin A alcohol.

6. The process for converting a retinene-hydroquinone complex to vitamin A alcohol, said complex being the product obtained by reacting two molar proportions of retinene with one molar proportion of hydroquinone, which comprises admixing said complex, an alkali metal borohydride selected from the class consisting of sodium borohydrides and potassium borohydrides, and a liquid carrier substantially inert to said borohydride, and thereafter hydrolyzing the resulting reaction product.

7. The process which comprises admixing a complex consisting of two molar proportions of retinene and one molar proportion of hydroquinone, sodium borohydride, and a liquid carrier comprised of a lower aliphatic alcohol, and thereafter hydrolyzing the resulting reaction product to vitamin A alcohol with an aqueous alkali.

8. The process for preparing vitamin A alcohol which comprises admixing a complex consisting of two molar proportions of retinene and one molar proportion of hydroquinone, potassium borohydride, and a liquid carrier comprised of a lower aliphatic alcohol, and thereafter hydrolyzing the resulting reaction product with an acidic hydrolyzing agent.

9. The process for converting a complex comprised of equimolar proportions of retinene and 2,5-di-tertiary amyl hydroquinone to vitamin A alcohol which comprises admixing said complex, an alkali metal borohydride selected from the class consisting of sodium borohydrides and potassium borohydrides, and a liquid carrier comprised of a lower aliphatic alcohol, and thereafter hydrolyzing the resulting reaction product.

10. The process for converting a retinene-hydroquinone complex to vitamin A alcohol, said complex being the product obtained by reacting two molar proportions of retinene with one molar proportion of hydroquinone, which comprises admixing said complex, an alkali metal borohydride selected from the class consisting of sodium borohydride and potassium borohydride, and a liquid carrier comprised of methanol, and thereafter hydrolyzing the resulting reaction product.

References Cited in the file of this patent

UNITED STATES PATENTS

| | | |
|---|---|---|
| 2,683,721 | Schlesinger et al. | July 13, 1954 |
| 2,683,747 | Benton et al. | July 13, 1954 |

OTHER REFERENCES

Schlesinger et al.: Jour. Amer. Chem. Soc., vol. 62 (1940), p. 3431.

Gridgeman: Chemistry and Industry, vol. 37 (Sept. 13, 1947), p. 555 (1 page).

Arens et al.: Rec. trav. Chim., vol. 68 (1949), p. 607–8 (2 pp.).